(12) United States Patent
Narimatsu et al.

(10) Patent No.: US 9,154,754 B2
(45) Date of Patent: Oct. 6, 2015

(54) PROJECTOR AND METHOD FOR CONTROLLING PROJECTOR

(71) Applicant: SEIKO EPSON CORPORATION, Tokyo (JP)

(72) Inventors: Shuji Narimatsu, Suwa (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 134 days.

(21) Appl. No.: 13/945,058

(22) Filed: Jul. 18, 2013

(65) Prior Publication Data

US 2014/0022514 A1    Jan. 23, 2014

(30) Foreign Application Priority Data

Jul. 23, 2012  (JP) ................ 2012-162386

(51) Int. Cl.
| | | |
|---|---|---|
| G03B 21/00 | (2006.01) |
| H04N 9/31 | (2006.01) |
| G03B 21/14 | (2006.01) |
| G03B 21/20 | (2006.01) |
| G03B 33/06 | (2006.01) |
| G09G 3/36 | (2006.01) |

(52) U.S. Cl.
CPC .............. *H04N 9/3155* (2013.01); *G03B 21/14* (2013.01); *G03B 21/2033* (2013.01); *G03B 33/06* (2013.01); *G09G 3/36* (2013.01); *H04N 9/3111* (2013.01); *G09G 2310/0235* (2013.01); *G09G 2320/0242* (2013.01); *G09G 2320/0261* (2013.01); *H04N 9/3197* (2013.01)

(58) Field of Classification Search
CPC . H04N 9/3114; H04N 9/3155; H04N 9/3164; H04N 9/3197; G09G 3/3406; G09G 3/3216

USPC .......... 353/31, 37, 85, 94, 121; 345/204–207; 362/20, 157–208, 276; 348/743–747, 348/E9.027
See application file for complete search history.

(56) References Cited

U.S. PATENT DOCUMENTS

| | | | | |
|---|---|---|---|---|
| 5,706,061 | A * | 1/1998 | Marshall et al. ............... | 348/743 |
| 6,217,174 | B1 * | 4/2001 | Knox ................ | 353/31 |
| 2005/0219475 | A1 * | 10/2005 | Mihara ................... | 353/94 |
| 2006/0023172 | A1 * | 2/2006 | Ikeda et al. ............. | 353/94 |
| 2006/0192728 | A1 * | 8/2006 | Kim ................ | 345/46 |
| 2008/0129714 | A1 * | 6/2008 | Akiyama et al. ............. | 345/204 |
| 2009/0195707 | A1 * | 8/2009 | Mizushima et al. .......... | 348/744 |
| 2010/0327766 | A1 * | 12/2010 | Recker et al. .............. | 315/291 |

FOREIGN PATENT DOCUMENTS

| | | |
|---|---|---|
| JP | 2006-162832 | 6/2006 |
| JP | 2011-249976 | 12/2011 |

* cited by examiner

*Primary Examiner* — Sultan Chowdhury
(74) *Attorney, Agent, or Firm* — Maschoff Brennan

(57) ABSTRACT

A projector including a first light source, a second light source that emits light having a color different from the first light source, a light modulator that modulates the light emitted from each of the first and the second light sources, and a controller that controls a first operation state in which the first and the second light sources are driven based on time division driving to perform image display and a second operation state in which the first and the second light sources are driven based on time division driving to perform illumination, wherein in the second operation state, a switching frequency at which the first and the second light sources are switched from one to the other is higher than a switching frequency at which the first and the second light sources are switched from one to the other in the first operation state.

10 Claims, 3 Drawing Sheets

PROJECTOR AND METHOD FOR CONTROLLING PROJECTOR

The entire disclosure of Japanese Patent Application No. 2012-162386, filed Jul. 23, 2012 is expressly incorporated by reference herein.

BACKGROUND

1. Technical Field

The present invention relates to a projector and a method for controlling the projector.

2. Related Art

There is a known projector configured to have a function of a display apparatus and to be usable as an illuminator (see JP-A-2011-249976 and JP-A-2006-162823, for example). The projector described in JP-A-2006-162823 is driven based on a time division color sequential drive method (filed sequential method) for image display and illumination.

Adding a function of an illuminator to a projector that displays images based on a field sequential method can disadvantageously complicate the circuit configuration of the projector. Further, when a user uses the projector as an illuminator, the produced illumination may cause the user discomfort. JP-A-2006-162823, however, does not describe any findings about the problem.

SUMMARY

An advantage of some aspects of the invention is to provide a projector having a simple circuit configuration that provides not only a function of a display apparatus but also a function of an illuminator and capable of providing satisfactory illumination that is unlikely to cause a user discomfort, and a method for controlling the projector.

A projector according to an aspect of the invention includes a first light source that is a solid-state light source, a second light source that is a solid-state light source and emits light having a color different from the color of light emitted from the first light source, a light modulator that modulates the light emitted from each of the first light source and the second light source, and a controller that controls a first operation state in which the first light source and the second light source are driven based on time division driving to perform image display and a second operation state in which the first light source and the second light source are driven based on time division driving to perform illumination, and in the second operation state, a switching frequency at which the first light source and the second light source are switched from one to the other in the time division drive operation is higher than a switching frequency at which the first light source and the second light source are switched from one to the other in the first operation state.

First, the projector according to the aspect of the invention has a simple circuit configuration because the image display and the illumination both performed based on time division driving allow a circuit for the image display and a circuit for the illumination to have the same circuit configuration.

Further, the projector according to the aspect of the invention is so configured that in the illumination operation (second operation state), the switching frequency at which the first light source and the second light source are switched from one to the other is set to be higher than the switching frequency at which the first light source and the second light source are switched from one to the other in the image display operation (first operation state). Occurrence of color breakup in the illumination operation can be therefore suppressed.

The configuration described above allows provision of a projector having a simple circuit configuration that not only provides both the function of a display apparatus and the function of an illuminator but also provides satisfactory illumination that is unlikely to cause a user discomfort.

In the aspect of the invention, it is preferable that the controller includes a common drive circuit that controls the first light source and the second light source together.

According to the configuration described above, the circuit configuration is preferably simplified.

In the aspect of the invention, it is preferable that, in the second operation state, the action of the light modulator is so locked that the light modulator performs white display.

According to the configuration described above, since the intensity of the light that exits out of the light source is the same as the intensity of the illumination light, the light intensity can be readily controlled.

In the aspect of the invention, it is preferable that the light modulator is a normally white liquid crystal light valve.

According to the configuration described above, it is not necessary to apply a voltage to the liquid crystal light valve in order to allow the liquid crystal light valve to transmit the light having exited out of the light source unit, whereby the power consumption of the projector can be lowered.

In the aspect of the invention, it is preferable that the switching frequency at which the first light source and the second light source are switched from one to the other in the second operation state is set at an integer multiple of the switching frequency at which the first light source and the second light source are switched from one to the other in the first operation state.

According to the configuration described above, since the switching frequency can be readily set based on the conditions under which the light source unit is driven in the image display operation, the circuit configuration is preferably simplified.

A method for controlling a projector according to another aspect of the invention is a method for controlling a projector including a first light source that is a solid-state light source, a second light source that is a solid-state light source and emits light having a color different from the color of light emitted from the first light source, a light modulator that modulates the light emitted from each of the first light source and the second light source, and a controller that controls a first operation state in which the first light source and the second light source are driven based on time division driving to perform image display and a second operation state in which the first light source and the second light source are driven based on time division driving to perform illumination, and in the second operation state, a switching frequency at which the first light source and the second light source are switched from one to the other in the time division drive operation is higher than a switching frequency at which the first light source and the second light source are switched from one to the other in the first operation state.

The method described above allows a provision of a projector control method that can provide both image display and illumination that is unlikely to cause a user discomfort.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment will be described below with reference to FIGS. 1, 2A and 2B, and 3A and 3B. In the following drawings, the dimension, ratio, and other factors of each component are not to scale as appropriate for ease of illustration.

Figure 1:
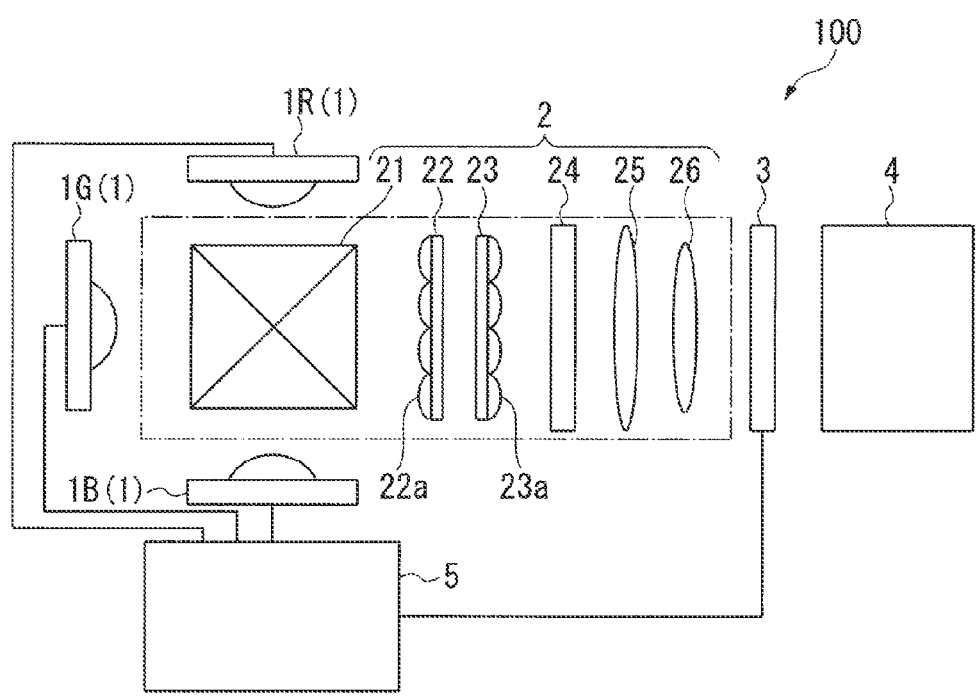
FIG. 1 is a schematic view showing a projector according to an embodiment.

FIG. 1 is a schematic view showing the projector according to the present embodiment. The projector 100 according to the present embodiment includes a light source unit 1, an illumination system 2, on which light having exited out of the light source unit 1 is incident, a liquid crystal light valve (light modulator) 3, on which light having passed through and exited out of the illumination system 2 is incident and which modulates the light (incident light), a projection system 4, which projects the light modulated by the liquid crystal light valve 3, and a control unit (controller) 5, which controls drive operation of the light source unit 1 and the liquid crystal light valve 3, as shown in FIG. 1.

The light source unit 1 includes a first light source 1R, which emits red light, a second light source 1G, which emits green light, and a third light source 1B, which emits blue light. The red light, the green light, and the blue light are an exemplary combination of typical element colors for displaying a full-color image. Each of the first light source 1R, the second light source 1G, and the third light source 1B is a solid-state light source and can, for example, be an LED, an organic or inorganic semiconductor laser, or an organic EL (electro-luminescent) device. A light source apparatus including an LED or a laser and a fluorescent member that absorbs light emitted from the LED or the laser and emits fluorescence may alternatively be used.

The light source unit 1, which includes the three light sources corresponding to the three different element colors in the present embodiment, may alternatively include light sources corresponding to four or more different element colors or light sources corresponding to two different element colors.

The illumination system 2 is formed of an optical path combining element 21, a lens array 22, a lens array 23, a polarization conversion element 24, a relay lens 25, and a field lens 26 sequentially arranged from the side where the light source unit 1 is present toward the direction where the light exits out of the illumination system 2.

The optical path combining element 21 is formed, for example, of a dichroic prism. A dichroic prism has a structure in which four triangular prisms are bonded to each other. The bonding surfaces of the triangular prisms that are bonded to each other form internal surfaces of the dichroic prism. A mirror surface that reflects the red light and transmits the green light and the blue light and a mirror surface that reflects the blue light and transmits the green light and the red light are formed perpendicularly to each other on the internal surfaces of the dichroic prism. The green light incident on the dichroic prism passes through the mirror surfaces and exits straight out of the dichroic prism. The red light and the blue light incident on the dichroic prism are selectively reflected off or allowed to pass through the mirror surfaces and exit out of the dichroic prism in the same direction as the direction in which the green light exits.

Each of the lens array 22 and the lens array 23 is what is called a fly's eye integrator and makes the luminance distribution of the light having exited out of the optical path combining element 21 uniform. The lens array 22 includes a plurality of lens portions 22a, and the lens array 23 includes a plurality of lens portions 23a. The lens portions 22a correspond to the lens portions 23a in a one-to-one relationship. Spatially separated portions of the light having exited out of the optical path combining element 21 are incident on the plurality of lens portions 22a. The lens portions 22a bring the light incident thereon into focus on the corresponding lens portions 23a. A secondary light source image is thus formed on each of the plurality of lens portions 23a.

The polarization conversion element 24 aligns the polarization states of the light fluxes having exited out of the lens array 23a with each other. The polarization conversion element 24 includes a plurality of polarization conversion cells corresponding to the lens portions 23a in a one-to-one relationship. The light fluxes incident on the polarization conversion element 24 pass through the polarization conversion cells and exit out of the polarization conversion element 24 with the polarization states aligned with each other to form (converted into) P-polarized or S-polarized light.

The light having exited out of the polarization conversion element 24 passes through the relay lens 25 and the field lens 26 and enters the liquid crystal light valve 3.

The liquid crystal light valve 3 can, for example, be a transmissive liquid crystal light valve. The liquid crystal light valve 3 includes a pair of polarizers and a liquid crystal panel positioned therebetween. The light having exited out of the light source unit 1 is incident on the liquid crystal light valve 3, which modulates the incident light on a pixel basis in accordance with an image signal supplied from the control unit 5 to form an image. The light (image) modulated (formed) by the liquid crystal light valve 3 passes through the projection system 4, which enlarges and projects the light on a projection surface.

The control unit 5 controls drive operation of the light source unit 1 and the liquid crystal light valve 3 based on a time division color sequential drive method (field sequential method). That is, the control unit 5 drives the first light source 1R, the second light source 1G, and the third light source 1B provided in the light source unit 1 based on the time division driving, in which the light sources are switched from one to another in a temporally continuous manner. On the other hand, the control unit 5 drives the liquid crystal light valve 3 based on the image signal in accordance with the type of the color light flux emitted from the light source being driven to form an image corresponding to the color light flux (the thus formed image is called a field image in some cases). The projector 100 can display a full-color image by switching a field image to another at a speed that does not allow the user to recognize the switching.

The projector 100 according to the present embodiment is capable of performing "image display" and "illumination." In the present embodiment, "image display" refers to a state in which the projector 100 projects an image. Further, in the present embodiment, "illumination" refers to a state in which the projector 100 works as an illuminator and provides "lighting" in an indoor or outdoor environment with the action of the liquid crystal light valve 3 locked and the liquid crystal light valve 3 keeping projecting constant light (including image light). In the following description, a case where the projector 100 is used to perform the image display is sometimes referred to as a "display mode" (first operation state), and a case where the projector 100 is used to perform the illumination is sometimes referred to as an "illumination mode" (second operation state). The control unit 5 can set one of the display mode and the illumination mode at a time as appropriate.

In addition to the configuration described above, the projector 100 may include a light diffuser on the optical path of the light projected by the projection system 4, and the light diffuser diffuses the illumination light in the illumination mode.

The projector 100 according to the present embodiment has the configuration described above.

The projector 100 according to the present embodiment operates based on the field sequential method in both the display mode and the illumination mode, which provides the following advantages.

Illumination can also be performed, for example, by simultaneously driving the first light source 1R, the second light source 1G, and the third light source 1B to emit light. In this case, however, it is necessary to provide a circuit that carries out the field sequential method in the display mode and an extra circuit that simultaneously drives the first light source 1R, the second light source 1G, and the third light source 1B (light source unit 1) to emit light. Further, in consideration of power source capacity necessary to drive the projector and cooling thereof, the circuit that allows the light source unit 1 to perform simultaneous light emission needs to be capable of analog light control. The circuit capable of pulse driving (display mode) and analog gray-scaling (illumination mode) has a complicated configuration, resulting in an increase in cost of the projector.

In contrast, when the projector 1 is configured to operate based on the field sequential method also in the illumination mode, the pulse driving is used in the illumination mode as well as in the display mode, which allows a common circuit configuration to be used in the display mode and the illumination mode. The thus achieved simple configuration can lower an increase in the cost of the projector provided with the illumination mode.

Figure 2A:
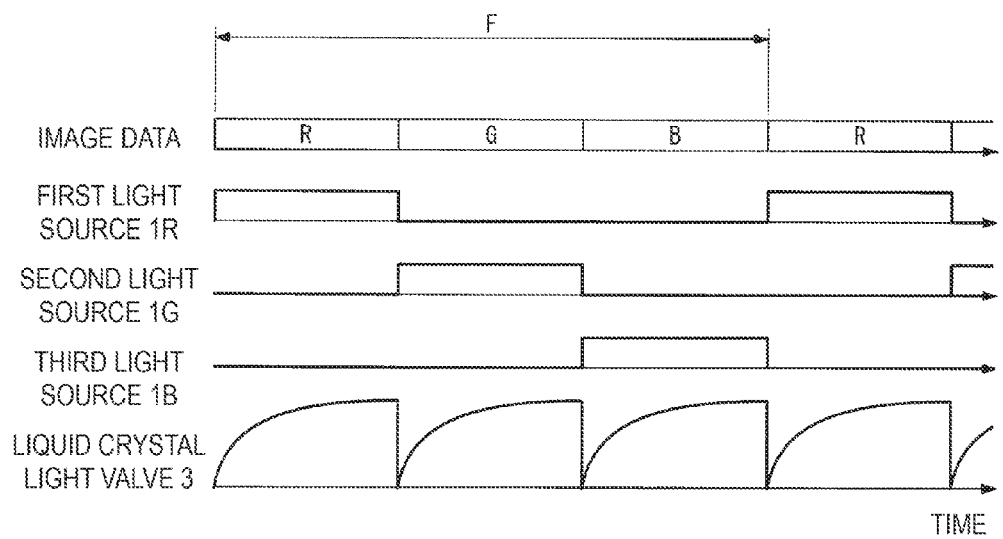
FIGS. 2A and 2B are timing charts showing driving operation of a light source unit and a liquid crystal light valve.
Figure 2B:
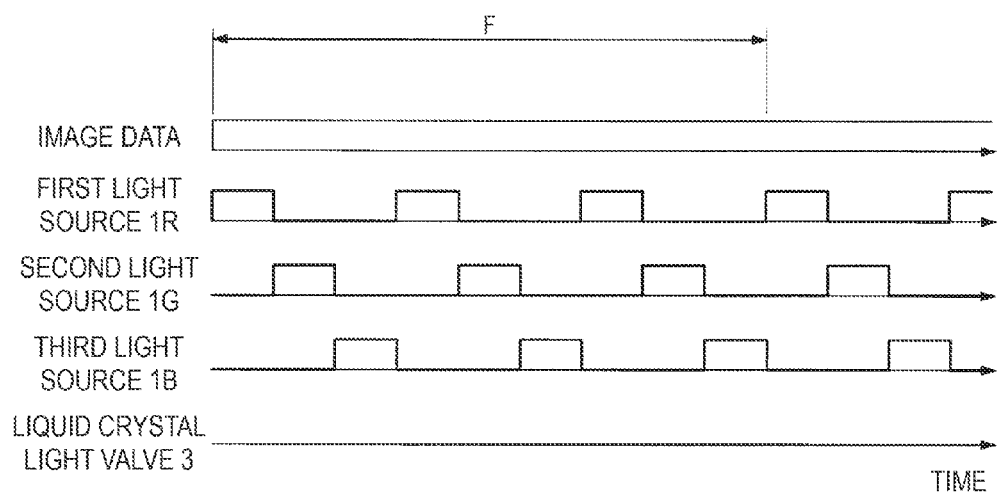

FIGS. 2A and 2B are descriptive diagrams showing a method for controlling the projector according to the present embodiment and timing charts showing driving operation of the light source unit and the liquid crystal light valve in the projector 100. FIG. 2A is a timing chart showing the drive operation of the light source unit and the liquid crystal light valve in the display mode, and FIG. 2B is a timing chart showing the drive operation of the light source unit and the liquid crystal light valve in the illumination mode. In each of the timing charts, the horizontal axis represents time, and the vertical axis represents binary values, ON and OFF. It is noted that the vertical axis of each of the timing charts represents the binary values for ease of description, and that finer voltage control may, of course, be performed.

When the projector 100 according to the present embodiment is operated in the display mode, the first light source 1R, the second light source 1G, and the third light source 1B are driven in a temporally continuous, sequentially repeated manner in a single full-color frame (indicated by reference character F in FIGS. 2A and 2B), as shown in FIG. 2A. Further, the liquid crystal light valve 3 is driven in synchronization with the drive operation of the light sources, and three field images (red image, green image, and blue image) corresponding to the color light fluxes emitted from the light sources are displayed. The three field images form a single full-color image, which is recognized by the user.

For example, when a frame is switched to another at a frequency of 60 Hz, each field image is displayed at a switching frequency of 180 Hz because three field images form a single frame.

On the other hand, when the projector 100 according to the present embodiment is operated in the illumination mode, the first light source 1R, the second light source 1G, and the third light source 1B are driven at a switching frequency higher than the switching frequency at which RGB field images are switched from one to another in the display mode, as shown in FIG. 2B. In FIG. 2B, the light sources are assumed to be driven at a switching frequency three times higher than that in the display mode. For example, the first light source 1R, the second light source 1G, and the third light source 1B are switched from one to another at a switching frequency of 540 Hz to output the color light fluxes in a period corresponding to a single frame in the display mode shown in FIG. 2A.

Further, the action of the liquid crystal light valve 3 is so locked that a single grayscale different from a grayscale used in black display is displayed. In FIGS. 2A and 2B, it is assumed that the liquid crystal light valve 3 is a normally white liquid crystal light valve and that the liquid crystal light valve 3 is not driven or is turned OFF (white display). Using a normally white liquid crystal light valve eliminates a need to apply a voltage to the liquid crystal light valve 3 in order to allow the liquid crystal light valve 3 to transmit the light having exited out of the light source unit 1, whereby the power consumption of the projector 100 can be lowered. The projector 100 can thus output light of a preset light intensity for illumination.

The liquid crystal light valve 3 does not necessarily perform the white display as described above as long as it performs any fixed-color display using a single grayscale other than the grayscale used in the black display. For example, when the liquid crystal light valve 3 is set to perform fixed intermediate grayscale (gray) display, illumination at a target light intensity can be performed by increasing the output from the light source unit 1 with the intensity of the light outputted from the projector 100 maintained at a fixed value. Further, a displayed content may be regularly or irregularly refreshed as required with the grayscale of the liquid crystal light valve 3 fixed at a single value. In this case, the refresh operation is preferably performed at a low frequency in order to suppress the power consumption.

Alternatively, in the illumination mode, the liquid crystal light valve 3 may be so set that the same grayscale is always displayed, or when the projector 100 is operated in the illumination mode intermittently, the grayscale of the liquid crystal light valve 3 may be changed in each intermittent illumination mode.

Further, to control the intensity of the illumination light outputted during the illumination mode, the output level of the light source unit 1 may be changed or the grayscale of the liquid crystal light valve 3 may be changed. The color tone of the illumination light can also be changed by adjusting light emission periods (pulse widths) of the first light source 1R, the second light source 1G, and the third light source 1B.

The projector 100 according to the present embodiment, which is driven as described above, can perform illumination with a reduced amount of color breakup, which is a problem specific to the field sequential method.

The "color breakup" is a phenomenon in which interaction between motion in the screen and motion of the eyes of the user (viewer) causes the viewer to perceive field images that form a full-color image separated from each other. The color breakup may occur, for example, when motion images containing fast motion are displayed or when the viewer moves the line of sight quickly rightward and leftward.

Whether or not the color breakup is recognized depends on individual sensitivities. However, the degree of color breakup can be qualitatively reduced by increasing the speed at which field images are switched from one to another (increasing switching frequency). A light modulator, such as the liquid crystal light valve 3, however, typically has a response speed slower than those of the first light source 1R, the second light source 1G, and the third light source 1B, each of which is a solid-state light source. The field image switching frequency is therefore determined in accordance with the response speed of the liquid crystal light valve 3. That is, the drive conditions of the first light source 1R, the second light source 1G, and the third light source 1B are set in accordance with the response speed of the liquid crystal light valve 3.

On the other hand, when the projector 100 is used to perform the illumination, in which a fixed single grayscale of the liquid crystal light valve 3 is displayed as described above, it is not necessary to control the drive conditions of the first light source 1R, the second light source 1G, and the third light source 1B in accordance with the response speed of the liquid crystal light valve 3. The first light source 1R, the second light source 1G, and the third light source 1B can therefore be driven at a switching frequency higher than that in the display mode. In the projector 100 according to the present embodiment, the first light source 1R, the second light source 1G, and the third light source 1B are driven at a switching frequency three times higher than that in the image display operation, as shown in FIG. 2B. It is therefore unlikely that the user recognizes color breakup in the outputted illumination light in the illumination mode of the projector 100.

In the illumination mode, the switching frequency at which the first light source 1R, the second light source 1G, and the third light source 1B are switched from one to another may be set as follows: The switching frequency at which the first light source 1R, the second light source 1G, and the third light source 1B are switched from one to another in the display mode is set as a reference; and the switching frequency in the illumination mode is set at the reference switching frequency multiplied by a constant. The setting described above can be made by calculating an integral multiple of the switching frequency in the display mode (for example, the switching frequency multiplied by three as shown in FIG. 2B) based on the drive conditions of the light source unit in the display mode, which are known conditions, whereby the circuit configuration is preferably simplified.

Figure 3A:
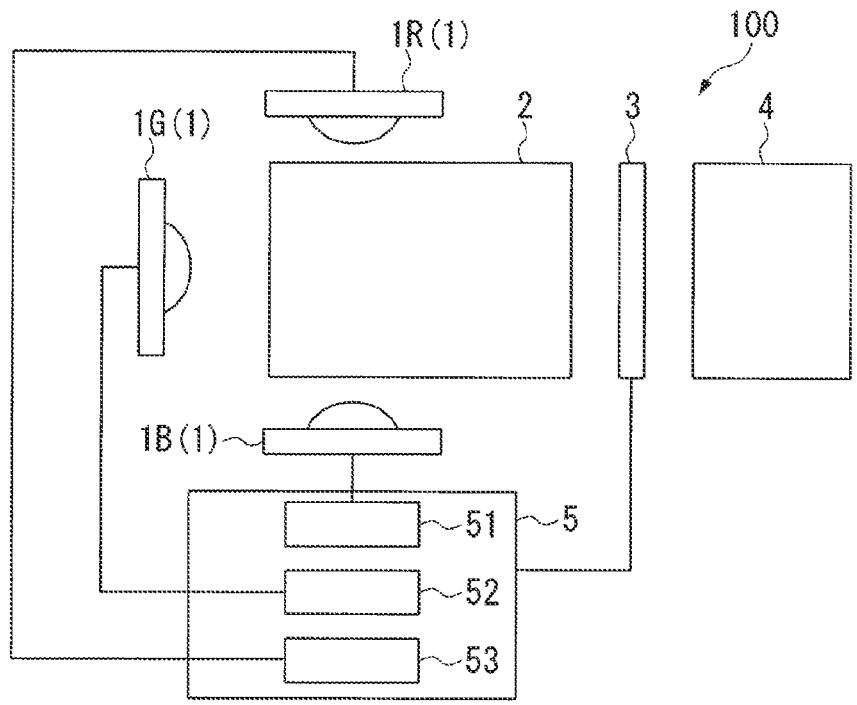
FIGS. 3A and 3B are descriptive diagrams for describing the configuration of a control unit.
Figure 3B:
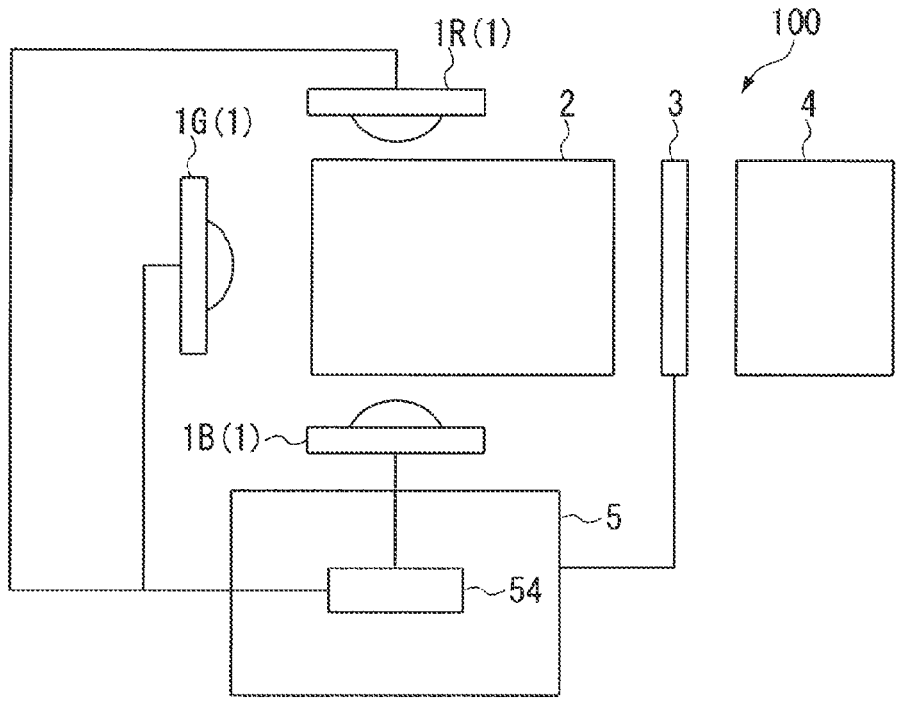

FIGS. 3A and 3B are descriptive diagrams for describing the configuration of the control unit 5. The control unit 5 may include driver circuits 51, 52, and 53, which independently control the first light source 1R, the second light source 1G, and the third light source 1B respectively as shown in FIG. 3A, or the control unit 5 may include a common driver circuit 54, which controls the first light source 1R, the second light source 1G, and the third light source 1B together as shown in FIG. 3B. Using a common driver circuit in the light source unit 1 as shown in FIG. 3B preferably simplifies the circuit configuration.

According to the projector 100 having the configuration described above, the function of a display apparatus and the function of an illuminator can both be provided, and satisfactory illumination that is unlikely to cause the user discomfort is achieved.

Further, according to the method for controlling the projector described above, image display and satisfactory illumination that is unlikely to cause the user discomfort can both be provided.

In the projector 100 according to the present embodiment, the transmissive liquid crystal light valve 3 is used as a light modulator, but the light modulator is not limited to the transmissive liquid crystal light valve. Instead of the example described above, a reflective liquid crystal light valve or a digital mirror device (DMD) may be used.

The preferable exemplary embodiment according to the invention has been described with reference to the accompanying drawings, but the invention is, of course, not limited thereto. The shapes, combinations, and other factors of the components shown in the embodiment described above are presented by way of example, and a variety of changes can be made based, for example, on design requirements to the extent that the changes do not depart from the substance of the invention.

What is claimed is:

1. A projector comprising:
a first light source that is a solid-state light source;
a second light source that is a solid-state light source and emits light having a color different from the color of light emitted from the first light source;
a light modulator that modulates the light emitted from each of the first light source and the second light source; and
a controller that controls a first operation state in which the first light source and the second light source are driven based on time division driving to perform image display and a second operation state in which the first light source and the second light source are driven based on time division driving to perform illumination,
wherein in the second operation state, a switching frequency at which the first light source and the second light source are switched from one to the other in the time division drive operation is higher than the switching frequency at which the first light source and the second light source are switched from one to the other in the first operation state.

2. The projector according to claim 1,
wherein the controller includes a common drive circuit that controls the first light source and the second light source together.

3. The projector according to claim 1,
wherein in the second operation state, the action of the light modulator is so locked that the light modulator performs white display.

4. The projector according to claim 3,
wherein the light modulator is a normally white liquid crystal light valve.

5. The projector according to claim 1,
wherein the switching frequency at which the first light source and the second light source are switched from one to the other in the second operation state is set at an integer multiple of the switching frequency at which the first light source and the second light source are switched from one to the other in the first operation state.

6. A method for controlling a projector including:
a first light source that is a solid-state light source,
a second light source that is a solid-state light source and emits light having a color different from the color of light emitted from the first light source,
a light modulator that modulates the light emitted from each of the first light source and the second light source, and
a controller that controls a first operation state in which the first light source and the second light source are driven based on time division driving to perform image display and a second operation state in which the first light source and the second light source are driven based on time division driving to perform illumination,
wherein in the second operation state, a switching frequency at which the first light source and the second light source are switched from one to the other in the time division drive operation is higher than the switching frequency at which the first light source and the second light source are switched from one to the other in the first operation state.

7. The projector according to claim 1,
wherein a single light modulator modulates the light emitted from both the first and second light sources.

8. The projector according to claim 1,
wherein in the second operation state, the light modulator is driven at a constant grayscale other than a black display, whereas in the first operation state the light modulator is driven at multiple different grayscales while the first and second light sources are driven.

9. The method according to claim 6,
wherein a single light modulator modulates the light emitted from both the first and second light sources.

10. The method according to claim 6,
wherein in the second operation state, the light modulator is driven at a constant grayscale other than a black display, whereas in the first operation state the light modulator is driven at multiple different grayscales while the first and second light sources are driven.

\* \* \* \* \*